United States Patent
Craine

(10) Patent No.: US 7,925,909 B1
(45) Date of Patent: Apr. 12, 2011

(54) EMERGENCY MOBILE DEVICE POWER SOURCE

(75) Inventor: Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 785 days.

(21) Appl. No.: 11/833,441

(22) Filed: Aug. 3, 2007

(51) Int. Cl.
 *G06F 1/26* (2006.01)
 *G06F 1/00* (2006.01)
 *H04M 1/00* (2006.01)

(52) U.S. Cl. .................. 713/320; 713/340; 455/572

(58) Field of Classification Search .............. 713/320, 713/340; 455/572
See application file for complete search history.

(56) References Cited

U.S. PATENT DOCUMENTS

| | | | |
|---|---|---|---|
| 5,838,139 A * | 11/1998 | Greene | 320/133 |
| 6,427,072 B1 * | 7/2002 | Reichelt | 455/404.1 |
| 7,206,567 B2 * | 4/2007 | Jin et al. | 455/404.1 |
| 7,627,769 B2 * | 12/2009 | Pantsu et al. | 713/300 |
| 2002/0016189 A1 * | 2/2002 | Sheynblat et al. | 455/574 |
| 2003/0003972 A1 * | 1/2003 | Sabat | 455/574 |
| 2008/0057894 A1 * | 3/2008 | Aleksic et al. | 455/187.1 |

\* cited by examiner

*Primary Examiner* — Chun Cao
(74) *Attorney, Agent, or Firm* — Moazzam & Associates, LLC

(57) ABSTRACT

In various aspects, a portable electronic device includes electrical components supported by a housing, the electrical components including a user interface coupled to a processor and a storage medium including an emergency power storage module coupled to the processor. The portable apparatus further includes one or more power storage devices configured to provide electrical energy to the electrical components, at least one power storage device operably controlled by the emergency power storage module to provide emergency electrical energy to the electronic components for an emergency communication.

17 Claims, 4 Drawing Sheets

EMERGENCY MOBILE DEVICE POWER SOURCE

BACKGROUND

Millions of portable electronic devices are in everyday use in the United States. Globally, the number is even greater. Examples of such devices include personal digital assistants (PDAs), laptop computers, mobile phones, two-way radios, global positioning system (GPS) receivers, wireless modems, etc. The foregoing are just a few of the numerous types of portable electronic devices that many people depend on for business, industry, and personal matters.

Many of the aforementioned devices rely on batteries to power the devices. Although many devices can operate for days, weeks, and sometimes even months on a single battery charge, these devices often need their batteries recharged or replaced on a regular interval to avoid losing power, and thus functionality of the device. Unfortunately, users often run out of battery power while using their electronic devices, sometimes during inopportune times.

Sometimes, a lack of battery capacity is a mere inconvenience to the user. However, emergencies do arise in which a portable electronic device—say, related to GPS locating and/or two-way communication—can mitigate critical circumstances. What's more, just a brief period of operation can make all the difference. For example, 40 seconds of available power so as to place an emergency mobile phone call can favorably alter the outcome of an emergency situation. Society's growing reliance on electronic devices increases the likelihood of inopportune power failures. Therefore, apparatus and methods for providing useful operating energy to portable electronic devices would have appreciable utility.

SUMMARY

This summary is provided to introduce general concepts of emergency mobile device power sources, which are further described below in the Detailed Description. This summary is not intended to identify essential features of the claimed subject matter, nor is it intended to limit the scope of the claimed subject matter.

In one aspect, a portable apparatus includes a portable electronic device with electrical components supported by a housing. The electrical components include a user interface coupled to a processor and a storage medium including an emergency power storage module coupled to the processor. The portable apparatus further includes one or more power storage devices configured to provide electrical energy to the electrical components. At least one power storage device is operably controlled by the emergency power storage module to provide emergency electrical energy to the electronic components for an emergency communication.

In another aspect, a method is provided that includes receiving a communication request on a portable electronic device, determining the communication request category, and rejecting the communication if the portable electronic device is using emergency backup power and the communication is not designated as an emergency communication.

In yet another aspect, a method for operating on emergency power includes receiving a designation of an emergency contact and determining if a communication request is associated with an emergency contact. When the communication request is associated with the emergency contact, the method further includes accepting the communication request by providing power from an emergency power source. When the communication request is not associated with the emergency contact, the method may include rejecting the communication request.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The detailed description is set forth with reference to the accompanying figures. The same reference numbers in different figures indicate similar or identical items.

DETAILED DESCRIPTION

Overview

The present disclosure illustrates apparatus and methods providing an emergency mobile device power source. Providing the emergency power source for mobile devices may allow users to more fully use their electronic device's battery capacity without concern for reserving power capacity for an emergency situation. For example, a user may exhaust their mobile phone battery and no longer be able to make or receive regular phone calls. However, an emergency power source may enable the user to complete a call or other communication categorized as an emergency, such as a 911 call, despite the unavailability of primary battery power. In some instances, the electronic devices may include reserve capacity for emergency communications, while in other instances electronic devices may reserve battery power using software control modules to manage reserve battery power. Still other instances may allow users to designate emergency contacts in addition to communications recognized as emergency communications. FIGS. 1-4 and the followings sections of the present disclosure describe apparatus and methods providing an emergency mobile device power source in further detail.

Illustrative Portable Electronic Devices

Figure 1:
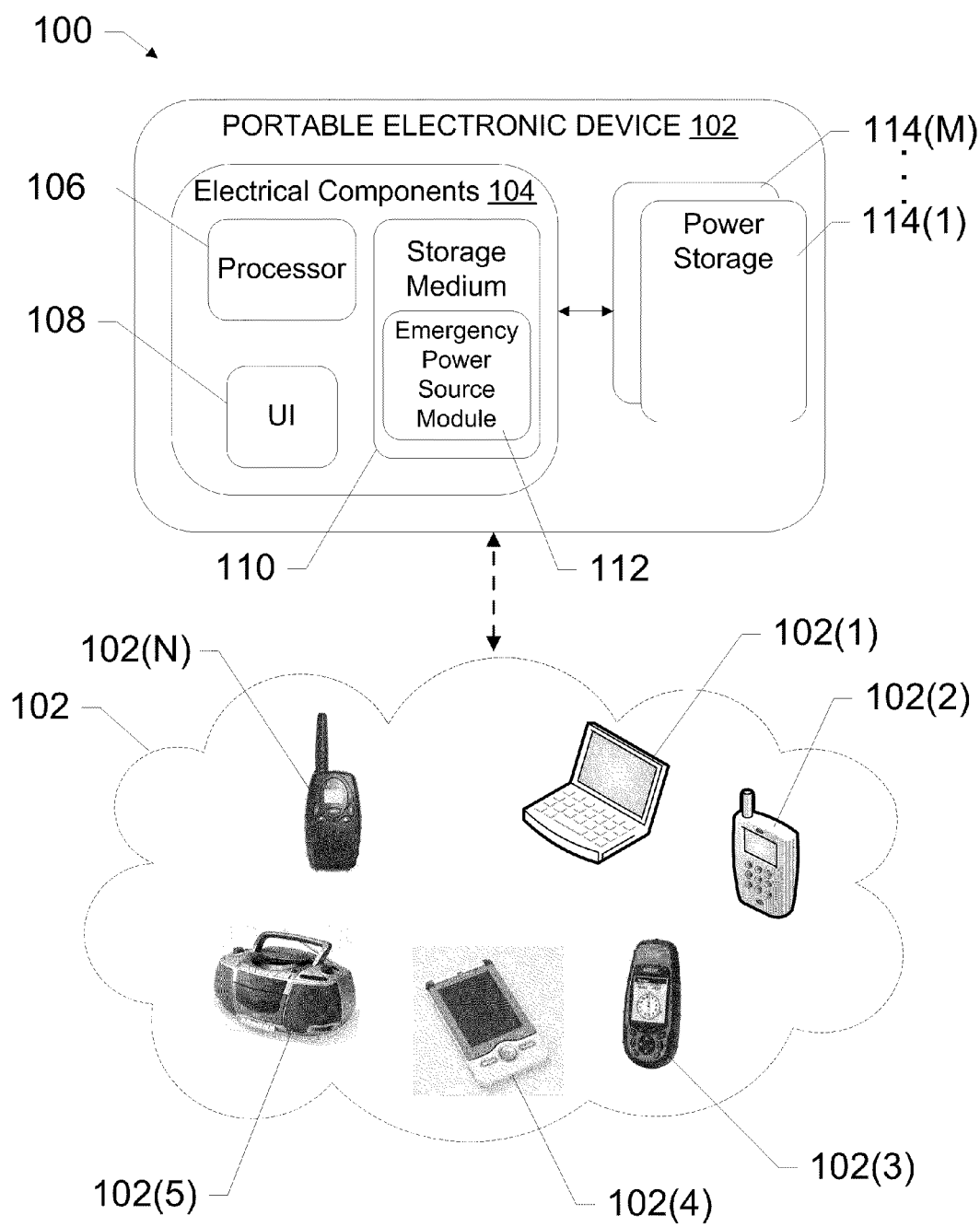
FIG. 1 is a schematic depicting illustrative portable electronic devices with an emergency mobile device power source.

FIG. 1 is a schematic depicting portable electronic devices with an emergency mobile device power source. An environment 100 includes a portable electronic device (PED) 102. The PED 102 may be any electronic device using batteries to provide at least a portion of the electronic operation. In some cases, the batteries may be a primary power source while in other cases batteries may provide a secondary or reserve power source.

The PED 102 may include a variety of possible portable electronic devices 102(1), . . . , 102(N). For example, the PED 102 may be a portable computer 102(1) (e.g., laptop, palmtop, etc.), a wireless phone 102(2) (e.g., mobile phones, cordless phones, etc.), a global positioning system (GPS) receiver 102(3), a personal data assistant (PDA) 102(4), a radio 102(5) (e.g., world band radio), and two-way radio 102(N) (e.g., "walkie-talkie"). In further aspects, it is contemplated that the PED 102 may include other digital communication devices that rely in part on battery power for operation.

The PED 102 further includes a number of electrical components 104. These electrical components 104 may include one or more processors 106 that are coupled to instances of a user interface (UI) 108. The UI 108 represents any devices and related drivers that enable the PED 102 to receive input from a user or other system, and to provide output to the user or other system. Thus, to receive inputs, the UI 108 may include keyboards or keypads, mouse devices, touch screens, microphones, speech recognition packages, imaging systems, or the like. Similarly, to provide outputs, the UI 108 may include speakers, display screens, printing mechanisms, or the like.

The electrical components 104 may include one or more instances of a computer-readable storage medium 110 that are addressable by the processor 106. As such, the processor 106 may read data or executable instructions from, or store data to, the storage medium 110. The storage medium 110 may contain an emergency power storage module 112, which may be implemented as one or more software modules that, when loaded into the processor 106 and executed, cause the PED 102 to perform any of the functions described herein, such as to provide an emergency mobile device power source in accordance with embodiments of the present disclosure. Additionally, the storage medium 110 may contain implementations of any of the various software modules described herein.

The electrical components 104 may further be coupled to one or more power storage devices 114 that provide electrical energy for at least part of the operation of the electrical components. The power storage devices 114 may include a lithium-ion battery, a Nickel-cadmium battery, Nickel metal hydride battery, Silver Zinc battery, or any other type of rechargeable or non-rechargeable power source configured to provide electrical energy to the electrical components 104. In some aspects, the electrical components 104 may be coupled to a plurality of power storage devices 114 arranged in series, however other configurations are contemplated. The power storage device 114 may include circuitry, such as voltage monitoring circuitry often included in "smart" batteries, among other internal power storage device controls and circuitry.

In some instances, the emergency power storage module 112 may be configured to monitor and allocate power for consumption by the electrical components 104. For example, the powered electrical components 104 enable the operation of the PED 102, such as the functionality of a mobile phone 102(2) to place a telephone call over a wireless network communication system. The emergency power storage module 112 may reserve, or otherwise allocate, a portion of the capacity of the power storage device 114 for emergency communications or operation of the PED 102.

In an illustrative operation, the emergency power storage module 112 may monitor the capacity of the power storage device 114 while the PED 102 is in operation. When the power storage device capacity drops below a threshold level, the emergency power storage module 112 may restrict operation of the PED 102 to emergency operations. For example, the emergency operation may include placing an emergency 911 telephone call. In such an instance, a caller may activate a telephone call when "911" is entered into the user interface 108 (via a keyboard or other input device). The emergency power source module 112 may then recognize the call as being classified as an emergency, and thus allocate at least a portion of the remaining power storage device 114 capacity to the electrical components 104 to complete the call. Conversely, if the caller tries to place a telephone call to a destination that is not identified as an emergency contact, the emergency power source module 112 may not allocate remaining power storage device's capacity to the electrical components 104. Further, in such an instance, the user interface 108 may display a message to the caller such as "battery power low and limited to emergency communications," among other messages indicating an activation of an emergency power mode.

As discussed above, the PED 102 may include additional power storage devices 114. In one implementation, the PED 102 includes two power storage devices 114. A first power storage device 114(1) may provide primary electrical power to the electrical components 104 while a backup emergency power storage device 114(M) is reserved for emergency operation of the PED 102. The emergency power source module 112 may be configured to activate the backup power storage device 114(M) when the primary power storage device's capacity has been exhausted, or substantially exhausted, and the PED 102 is operated in an emergency situation. For example, the emergency power source module 112 may allocate power from the backup power storage device 114(M) to monitor incoming calls, but may only allow the PED 102 to receive or place communications that are designated as emergency communications. For example, the emergency power source module 112 in the radio 102(5) may monitor a radio frequency via a standby mode, but only activate audio components to emit emergency weather reports while otherwise deactivating audio components.

The emergency mobile device power source may enable a longer standby status of the PED 102, or other operational status, while enabling the user to complete emergency communications. In some instances, the user may desire to override the emergency power source module 112 and use the PED 102 to receive a non-emergency communication despite limited power storage device 114 capacity, such as when the primary power storage device 114(1) is substantially exhausted and the PED is operating on electrical energy from the emergency backup power storage device 114(M).

Figure 2:
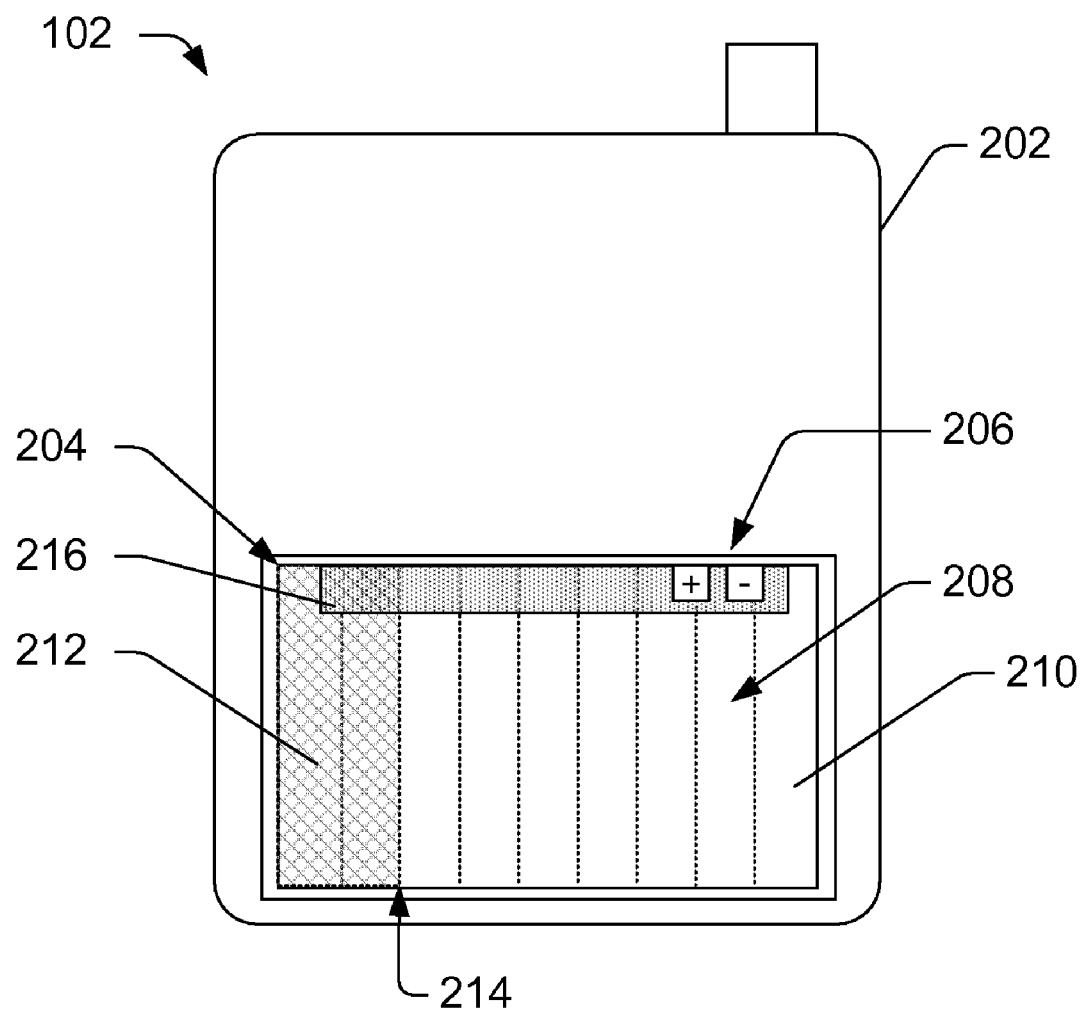
FIG. 2 is a schematic view showing an illustrative portable electronic device with a partitioned battery.

FIG. 2 is a schematic view showing an illustrative portable electronic device 102 with a partitioned power storage device. The PED 102 may include a housing 202 and a power storage device 204 configured with a partition of the power storage device's power capacity. The power storage device 204 includes one or more connection terminals 206, including a positive and negative lead, for powering the electrical components 112 with electrical energy from the power storage device 204.

The power storage device 204 includes a number of elements 208 for retaining the power storage device capacity. The elements 208 may be configured to provide power to the electrical components 112 using some elements 208, while other elements do not provide power and thus remain in a charged state. For example, a first set of elements 210 may provide primary capacity to the electrical components 112 while a second set of elements 212 may provide emergency backup capacity to the electrical components. The elements 208 may further include a partition 214 for separating the first set of elements 210 and second set of elements 212. In some instances, the partition 214 may be a physical partition, such as to physically isolate the first and second set of elements. In such an instance, the partition may operate analogous to a vehicle with a separate reserve fuel tank where a driver may select the reserve tank in emergency situations such as when he runs out of gas in the primary gas tank while driving on a remote highway.

Alternatively, the partition 214 may be a virtual partition, analogous to a partition used for dividing a computer hard drive for use by different resources. In such an instance, the partition may enable designation of elements on either side of the partition 214, thus separating the first set of elements 210 from and the second set of elements 212.

To further control the partition 214, the power storage device may include electronic circuitry 216. The electronic circuitry 216 may include the one or more connection terminals 206. In some instances, the electronic circuitry 216 may include two connection terminals 206, where a first terminal is in connection with the first set of elements 210 and a second terminal is in connection with the second set of elements. The emergency power source module 112 may be operably coupled to the electronic circuitry 216 to controllably allocate electrical energy from the power storage device between the first and second terminal, and thus the first set of elements 210 for primary power and the second set of elements 212 for emergency backup power.

In some instances, the electronic circuitry 216 may enable repartitioning of the partition 214. For example, the electronic circuitry 216 may include a number of switches which may be configured to selectively group the elements 208 to create the first and second set of elements 210, 212.

Illustrative Operation

Figure 3:
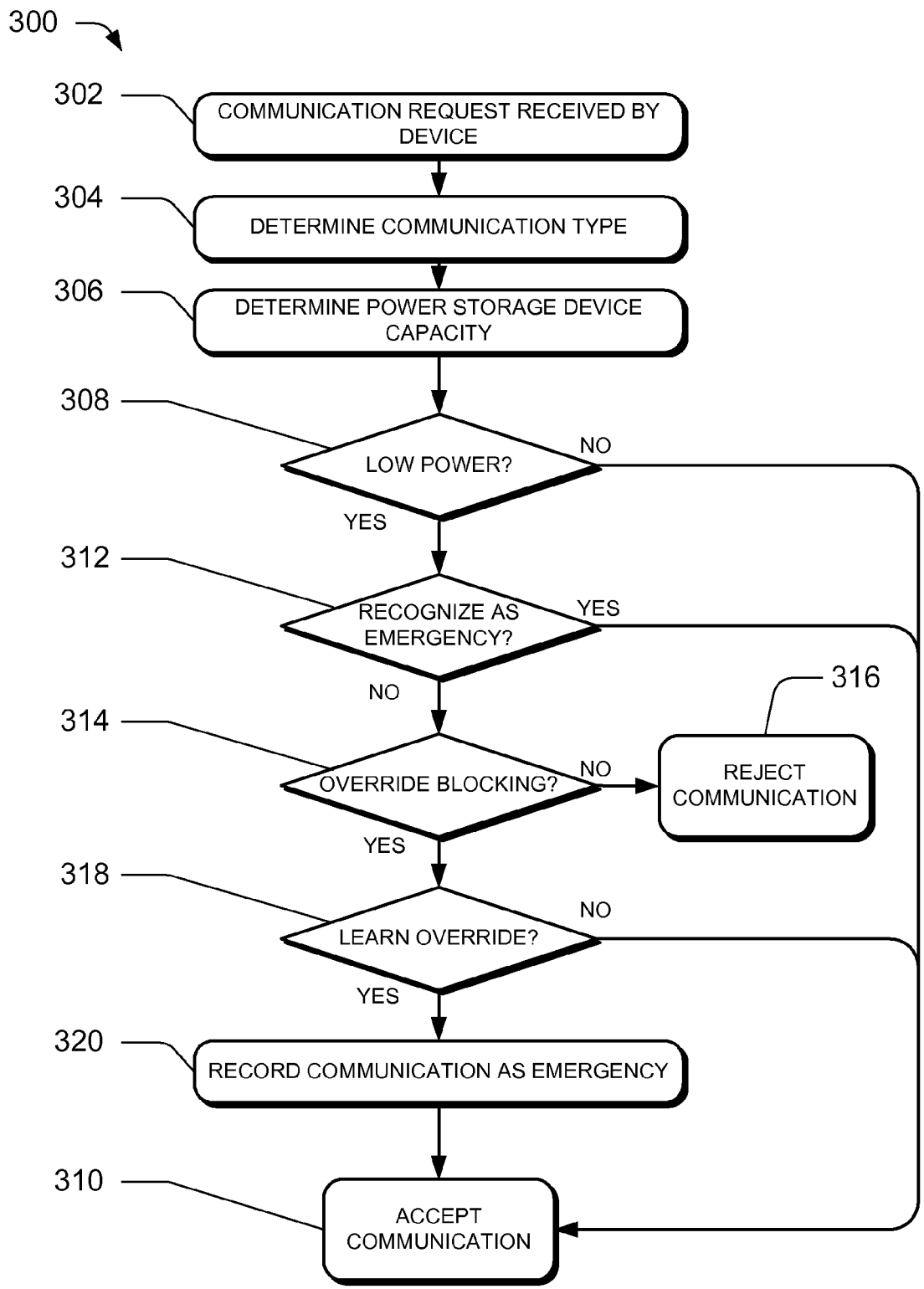
FIG. 3 is a flow diagram depicting an illustrative technique for managing communications based on a capacity of a power source.

FIG. 3 is a flow diagram depicting an illustrative process 300 for managing communications based on a capacity of a power source. The process includes a block 302 for receiving a communication request by the PED 102. For clarity, receiving a communication request may include the receipt of a communication request from an external transmitter (e.g., a call from another party) or the receipt of a communication request from the user on the PED (e.g., the user entering a telephone number and then placing the call from the PED).

At a block 304, the process 300 determines the communication type. For example, the communication is categorized as an emergency communication or a non-emergency communication. In other instances, additional categorizations may enable a user to allocate a reserve power source for other operations. The power storage device power capacity may be determined at a block 306. For example, the emergency power source module 112 may monitor the power storage device's capacity of the primary power storage device 114(1) to determine if the power storage device power capacity is substantially exhausted.

The process 300 continues at a decision block 308 where a determination is made whether the power storage device's power is low (i.e., substantially exhausted). If the power storage device's power is not low, then the process 300 continues to a block 310 and the communication is accepted. In other words, the communication may be received by the PED 102 from an external device, such as via a wireless communication network. Alternatively, the block 310 may initiate a communication from the PED 102 to another electronic device in a remote location. If the power storage device's power is low, the process 300 continues to a decision block 312.

At the decision block 312, a determination is made whether the communication is recognized as an emergency communication. If the communication is recognized as an emergency communication, the process 300 advances to block 310, otherwise the process continues to a decision block 314. At the decision block 314, the process 300 determines whether an override blocking function is initiated to allow receipt of the communication. For example, the override blocking function may include computer code stored in the storage medium 110 and accessed by the emergency power source module 112 to determine whether to accept the communication request and thus enable the electrical components 104 to access power from the emergency backup power storage device 114(M). If override blocking is not selected, then the process 300 may advance to a block 316 where the communication is rejected. Alternatively, the process advances to a decision block 318.

A determination is conducted whether the override should be recorded in memory at the decision block 318. For example, the override may be recorded in the storage medium as a "learned" emergency contact. Therefore, if the same communication request is received by the PED 102, at the decision block 312, the communication may be recognized as an emergency contact and thus the communication may be accepted at the block 310. If the decision includes storing the override, the process 300 may record the communication as an emergency at a block 320. Regardless of the decision at the decision block 318, the communication is ultimately accepted at the block 310.

Generally speaking, the process 300 is illustrative of a process enabling detection and categorization of communications as emergency contacts, thus allocating an emergency power source to complete an emergency communication when primary power is substantially exhausted. This process may allow a user to complete a call when they may otherwise be unable to use the portable electronic device 102 because its power source may have been depleted by non-emergency calls. As described below, emergency contacts may be created using other techniques.

Figure 4:
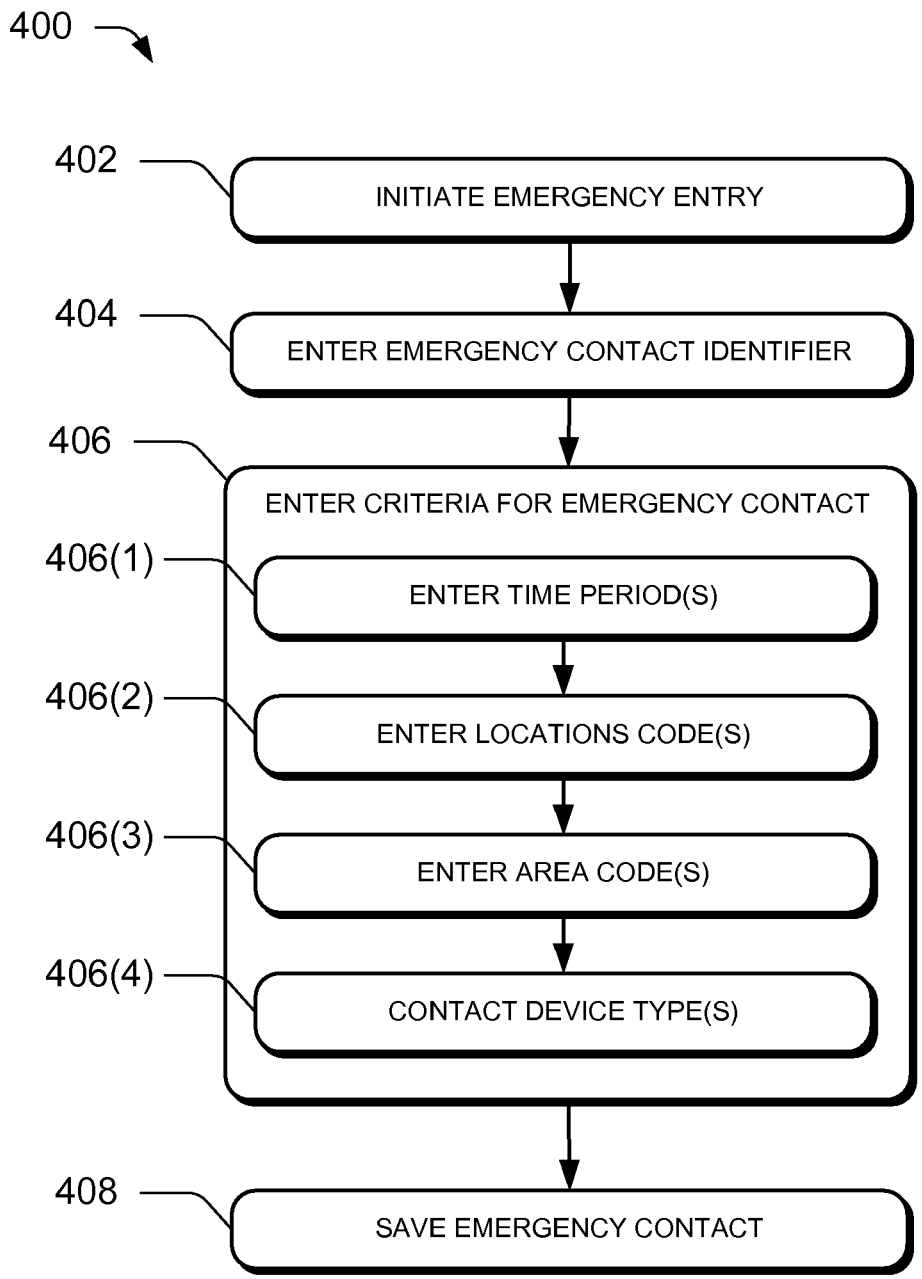
FIG. 4 is a flow diagram depicting an illustrative process for creating an emergency contact to access an emergency power source.

FIG. 4 is a flow diagram depicting an illustrative process 400 for creating an emergency contact to access an emergency power source. The process 400 includes initiating an emergency entry at a block 402. For example, the user interface 108 may enable a user to enter an emergency contact creation screen, perhaps via a menu interface implemented on a mobile telephone 102(2). At a block 404, the emergency contact identifier is entered. The emergency contact identifier may be a telephone number, a contact name associated with communications, or other criteria allowing a user to selectively identify a contact or entity relating to communications. In some instances, the process 400 may include a list of predetermined contacts which the user may browse and selectively activate or otherwise designate as an emergency contact.

The process further includes a block 406 enabling entry of criteria for emergency contacts. The block 406 includes sub-blocks 406(1)-(4) listing either exclusive or non-exclusive criteria for designating emergency contacts. The sub-block 406(1) may allow the user to enter one or more time periods for the emergency contact selected at the block 404. For example, the user may desire to designate a call from his wife between 10:00 pm and 8:00 am, perhaps due to an irregularity in receiving calls during this time period from the particular contact. It is also contemplated that the user may desire to generally categorize communications during a particular time period as emergency communications via the sub-block 406(1), such as by designating all calls between 12:00 a.m. and 5:00 a.m. as emergency calls.

At the sub-block 406(2) the user may designate one or more location codes for classification as an emergency communication. In some instances, GPS location data may be used to determine when a contact is designated as an emergency contact. For example, the user may designate a call from a particular GPS coordinate range as being classified as emergency communications. At the sub-block 406(3), when using a mobile telephone, the user may select all communications from a particular area code to be classified as emergency contacts.

Finally, at the sub-block 406(4) includes designating contacts based on the device type. In some instances the user may select devices based on the PED 102 type, such as those listed in 102(1)-(N). In one instance, the user may select communications received from the user's network provider as emergency contacts. In another example, a communication from a satellite based telephone may be designated as an emergency contact, and thus enable the user to automatically override the decision block 312 in FIG. 3 to accept the communication despite the substantial exhaustion of power from the primary power storage device on the user's PED 102.

In some instances, the classification may be dynamically based on the criteria entered at the block 404. For example, a communication may be categorized as an emergency contact during a first situation (e.g., time period) and may not be designated as an emergency contact during a second situation. The process 400 may save the emergency contact, as created via the blocks 402-406, such as by storing the emergency contact information in the storage medium 110 as illustrated in FIG. 1.

CONCLUSION

Although exemplary embodiments have been described in language specific to structural features and/or methodological acts, it is to be understood that the embodiments are not necessarily limited to the specific features or acts described. Rather, the specific features and acts are disclosed as exemplary forms of implementing the embodiments.

What is claimed is:

1. A portable apparatus, comprising:
   electrical components supported by a housing, the electrical components including:
      a user interface coupled to a processor; and
      a storage medium including an emergency power storage module coupled to the processor; and
   one or more power storage devices configured to provide electrical energy to the electrical components, at least one power storage device operably controlled by the emergency power storage module to provide emergency electrical energy to the electronic components for an emergency communication, wherein the user interface includes an override configured to enable a user to override the emergency power storage module from blocking a communication when the communication is incoming, the override including recording the communication request associated with the override selection.

2. The portable apparatus of claim 1, wherein the power storage device includes a plurality of elements for storing electrical energy.

3. The portable apparatus of claim 2, wherein at least one power storage device includes a partition defining a primary set of elements and an emergency backup set of elements, the primary set of elements providing primary electrical energy to the electrical components, the emergency backup set of elements controlled by the emergency power storage module to provide emergency electrical energy to the electronic components for an emergency communication.

4. The portable apparatus of claim 3, wherein the at least one power storage device further includes electronic circuitry configured to selectively designate the partitioning of elements between the primary set of elements and the emergency backup set of elements.

5. The portable apparatus of claim 1, wherein the power storage device includes a primary power source and an emergency backup power source, the primary power source providing primary electrical energy to the electrical components, the emergency backup power source controlled by the emergency power storage module to provide emergency electrical energy to the electronic components for an emergency communication.

6. The portable apparatus of claim 1, wherein the user interface is configured to facilitate designation of emergency contacts, and wherein the storage medium is configured to record the designated emergency contacts.

7. The portable apparatus of claim 1, wherein the emergency power storage module enables categorization of communications of emergency communications.

8. The portable apparatus of claim 1, wherein the portable apparatus is a mobile telephone.

9. A method, comprising:
   receiving a communication request on a portable electronic device;
   determining a category associated with the communication request;
   rejecting the communication request if the portable electronic device is using emergency backup power an the communication request is not designated as an emergency communication;
   enabling a user to selectively override the rejection of the communication request at the time of the communication request, the override including recording the communication request associated with the override selection.

10. The method of claim 9, wherein communication request categories include communication requests designated as emergency communication requests and communication requests designated as non-emergency communication requests.

11. The method of claim 9, wherein the override designates the communication request as a designated emergency communication.

12. The method of claim 9, wherein the portable electronic device operates on less than full power when receiving the communication request, and wherein an activation of the designated emergency communication enables the portable electronic device to operate on full power.

13. A method for operating on emergency power, comprising:
   receiving a designation of an emergency contact;
   determining if a communication request is associated with an emergency contact;
      accepting the communication request by providing power from an emergency power source if the communication request is associated with the emergency contact; and
      rejecting the communication request if the communication request is not associated with the emergency contact,
      wherein a user may selectively override the rejection of the communication request at the time of the communication request, the override including recording the communication request associated with the override selection as an emergency contact.

14. The method of claim 13, further comprising prompting the user to enter at least one criterion for designating a communication request as an emergency contact.

15. The method of claim 14, wherein the at least one criterion includes a time range for the emergency communication.

16. The method of claim 14, wherein the at least one criterion includes a location code for the emergency communication.

17. The method of claim 14, wherein the at least one criterion includes a device type for the emergency communication.

* * * * *